United States Patent
Brockington et al.

(10) Patent No.: US 7,722,091 B1
(45) Date of Patent: May 25, 2010

(54) RV WASTE DISCHARGE SEWER LINE TWO-PART ADAPTER ASSEMBLY WITH FLEXIBLE SEAL AND LOCKING MECHANISM

(75) Inventors: William T. Brockington, Kernersville, NC (US); Anthony D. Moore, Summerfield, NC (US); Robert C. Mancari, High Point, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 134 days.

(21) Appl. No.: 11/703,846

(22) Filed: Feb. 8, 2007

(51) Int. Cl.
*F16L 25/00* (2006.01)
(52) U.S. Cl. .................. 285/361; 285/402; 285/396
(58) Field of Classification Search .............. 285/361, 285/402, 360, 401, 396, 179, 12
See application file for complete search history.

(56) References Cited

U.S. PATENT DOCUMENTS

| | | | | |
|---|---|---|---|---|
| 61,607 A * | 1/1867 | Craig | ............. | 285/361 |
| 171,389 A * | 12/1875 | Klotz | ............. | 285/179 |
| 808,446 A * | 12/1905 | Gill et al. | ............. | 285/360 |
| 1,282,681 A * | 10/1918 | Faribault | ............. | 135/114 |
| 2,988,755 A | 6/1961 | Roland | | |
| 3,760,430 A | 9/1973 | Brenden | | |
| 4,133,347 A | 1/1979 | Mercer | | |
| 4,173,989 A * | 11/1979 | Prest | ............. | 138/109 |
| 4,223,702 A | 9/1980 | Cook | | |
| 4,231,595 A | 11/1980 | Knutsen | | |
| 4,650,224 A * | 3/1987 | Smith | ............. | 285/145.5 |
| 4,688,833 A * | 8/1987 | Todd | ............. | 285/148.14 |
| 4,722,556 A * | 2/1988 | Todd | ............. | 285/12 |
| 4,758,027 A * | 7/1988 | Todd | ............. | 285/148.23 |
| 5,215,335 A * | 6/1993 | Hamm, Jr. | ............. | 285/39 |
| 5,667,251 A * | 9/1997 | Prest | ............. | 285/12 |
| 5,667,256 A * | 9/1997 | Caine | ............. | 285/148.23 |
| 5,971,438 A * | 10/1999 | Johnson | ............. | 285/12 |
| 6,546,573 B1 * | 4/2003 | Ball | ............. | 4/680 |
| 6,702,337 B2 * | 3/2004 | Rutter et al. | ............. | 285/377 |
| D561,302 S * | 2/2008 | Brockington et al. | ...... | D23/262 |
| D564,637 S * | 3/2008 | Brockington et al. | ...... | D23/263 |
| 2006/0064809 A1 * | 3/2006 | Isgro | ............. | 4/288 |

OTHER PUBLICATIONS

Ref. No. 1, Blueline Universal Elbow (P/N 01-0001), Prest-O-Fit Website (www.prestofit.com), Jan. 26, 2007.
Ref. No. 2, Universal Sewer Adapter (P/N F02-3103), Valterra Website(www.valtarra.com), Jan. 26, 2007.
Ref. No. 3, Easy Slip 4-in-1 Sewer Adapter with Elbow (P/N 39144), Camco website (www.camco.net), Jan. 26, 2007.

* cited by examiner

*Primary Examiner*—Aaron M Dunwoody

(57) ABSTRACT

An adapter assembly for connecting a sewage drain pipe to a sewage disposal site inlet in fluid communication includes a hollow tubular member, a hollow adaptive member and flexible seal. The hollow tubular member having an open inlet adapted to engage threadable or otherwise to the end of a sewage drain pipe. A hollow adapter member having an open discharge end with adaptive features to be inserted into disposal site inlet. The tubular and adapter member interfacing via a rotational positive mechanical lock compressing an annular flexible seal radially or axially to ensure a dependable, long lasting low pressure fluid tight seal.

10 Claims, 4 Drawing Sheets

RV WASTE DISCHARGE SEWER LINE TWO-PART ADAPTER ASSEMBLY WITH FLEXIBLE SEAL AND LOCKING MECHANISM

BACKGROUND OF THE INVENTION

1. Field of the Invention

This invention relates generally to sewage pipe adapters and specifically to an adapter for interconnecting a sewage drain pipe and the inlet opening of a sewage disposal site.

2. Description of the Related Art

Recreational Vehicle (RV) camping has evolved such that storage and disposal of sewage is often required. It is desirable to dispose of sewage quickly, effectively and cleanly with a compact drainage system that can be carried in the RV. A drainpipe system consisting of a flexible compressible corrugate drainpipe with fittings adaptable to the RV at one end and the sewage disposal site at the other is most often employed for this purpose.

Sewage disposal sites have a variety of intake sizes and types most commonly with a vertical orientation. Adapting between the RV and a vertically oriented disposal site intake with a flexible drain pipe system makes it desirable to have an angled adapter with multiple sizes at the discharge end complimentary to the most common disposal site inlet types.

The RV bumper is most often utilized to store the drainpipe system although it is desirable to make the system as compact as possible in all cases. It is therefore desirable to have the discharge adapter a two-part device that can be interconnected in leak free fluid communication during use, but separated for storage. Moreover, simple, easy, rapid assembly and disassembly of such a two part adapter is desirable.

Such a two-part adapter need be leak free due to the noxious nature of the contents. It is therefore desirable not only to have a dependable leak free connection between both parts, but a connection that can only be separated when intended preventing unwanted waste spillage due to unintended contact or fluid forces exerted on the adapter during dumping. Consequently, it is highly desirable to have a positive mechanical lock.

There are numerous patents addressing the need for coupling and adapting corrugated drainpipe between an RV and a sewage disposal site. Refer, for example U.S. Pat. Nos. 2,988,755; 3,760,430; 4,133,347; 4,173,989; 4,223,702; and 4,231,595. However these adapters do not address the need for rapid disassembly problems associated with a two-part adapter. U.S. Pat. No. 4,758,027; identifies a system that utilizing a quick cam release system and hard interference seal and friction connection. The sealing system described in the patent only inhibits the escape of noxious discharge and does not ensure a fluid seal and gets worse as the two parts wear with multiple uses. In addition, the friction connection will wear with time reducing its effectiveness. The friction connection, even from its first use will occasionally become dislodged if unintentionally contacted. None of these devices address the need for a secure connection with a dependable flexible seal and positive mechanical lock.

OBJECTIVES AND SUMMARY OF THE INVENTION

Therefore, the principal object of the present invention is to provide a positively mechanically locking adapter assembly which couples a RV flexible sewage drainpipe in fluid communication to a sewage disposal site inlet to provide a dependable convenient method of disposing of fluid waste.

It is another objective of the present invention to provide a dependable flexible sealing method to ensure no escape of noxious fumes or liquid between the two parts of the two-part adapter assembly.

The above and further objects of the present invention are realized by providing a two-part adapter assembly with a positive mechanical lock and flexible seal compressed therebetween via connection of the two parts of the adapter assembly for securely coupling in fluid communication a sewage drain pipe to a sewage disposal site.

The two-part adapter assembly includes a tubular member which is threadable on one end for joining to a flexible RV corrugated sewage drainpipe and an adapter member which is rotatably connectable to the tubular member on one end and joined to a disposal site inlet on the opposite end. The tubular member and the adapter member are connected with a flexible seal compressed therebetween. In one embodiment the tubular member includes a series of lugs which are positionable and rotatable in lug channels located in the adapter member. The two parts of the adapter assembly provide a coupling between a flexible RV sewage drainpipe and a sewage disposal inlet for transfer of fluids to ensure secure containment of noxious fumes and liquids when disposing of fluid waste from an RV.

BRIEF DESCRIPTION OF DRAWINGS

The above and further objectives and features of this invention and the manner of attaining them will become apparent, and the invention will be clarified by reference to the following description embodiments of the invention, taken in conjunction with the accompanying drawings, wherein.

DESCRIPTION OF PREFERRED EMBODIMENTS

Figure 1:
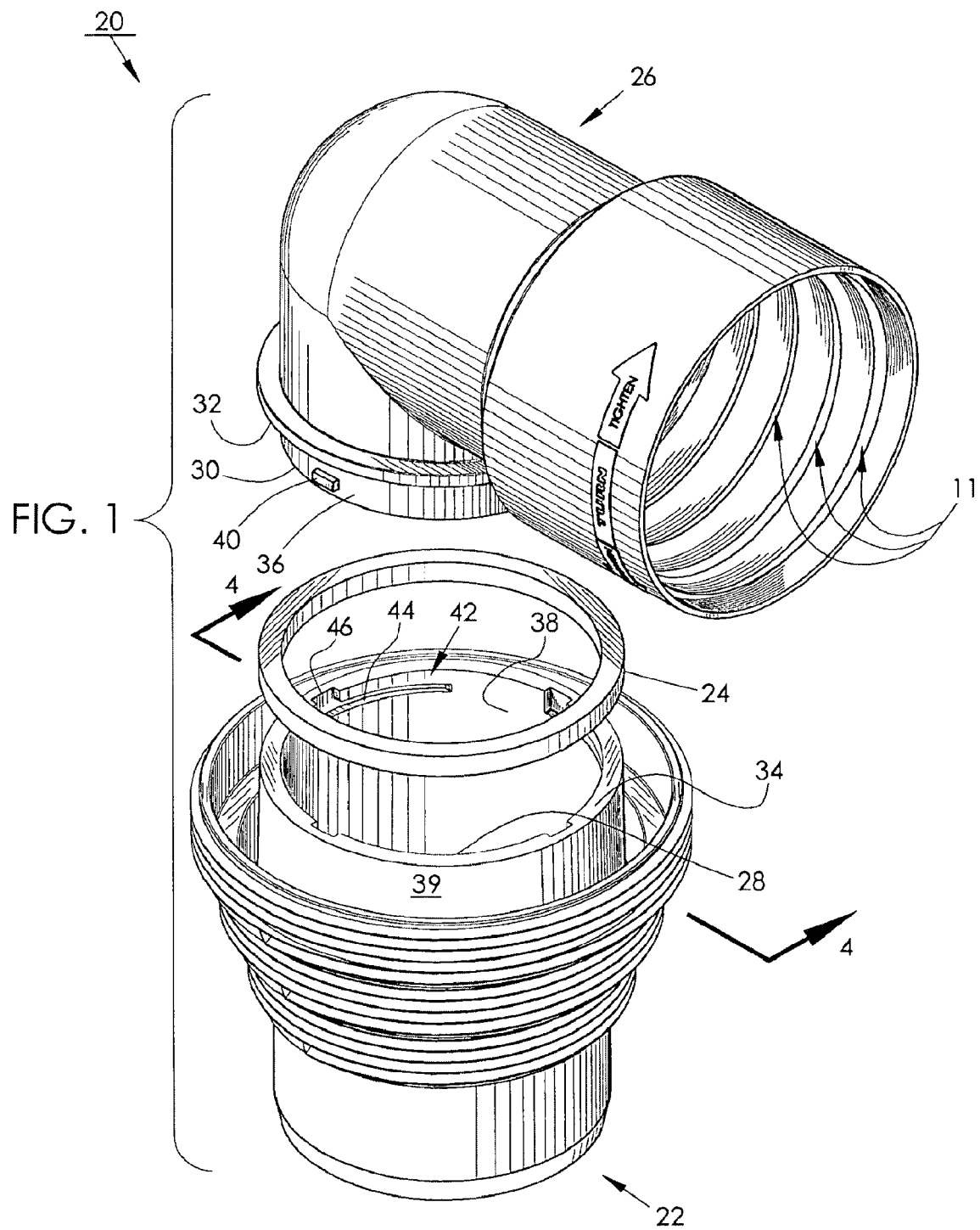
FIG. 1 is a front, top right perspective exploded view of an RV waste discharge sewer line two-part adapter assembly with flexible seal and locking mechanism constructed in accordance with the present invention.
Figure 2:
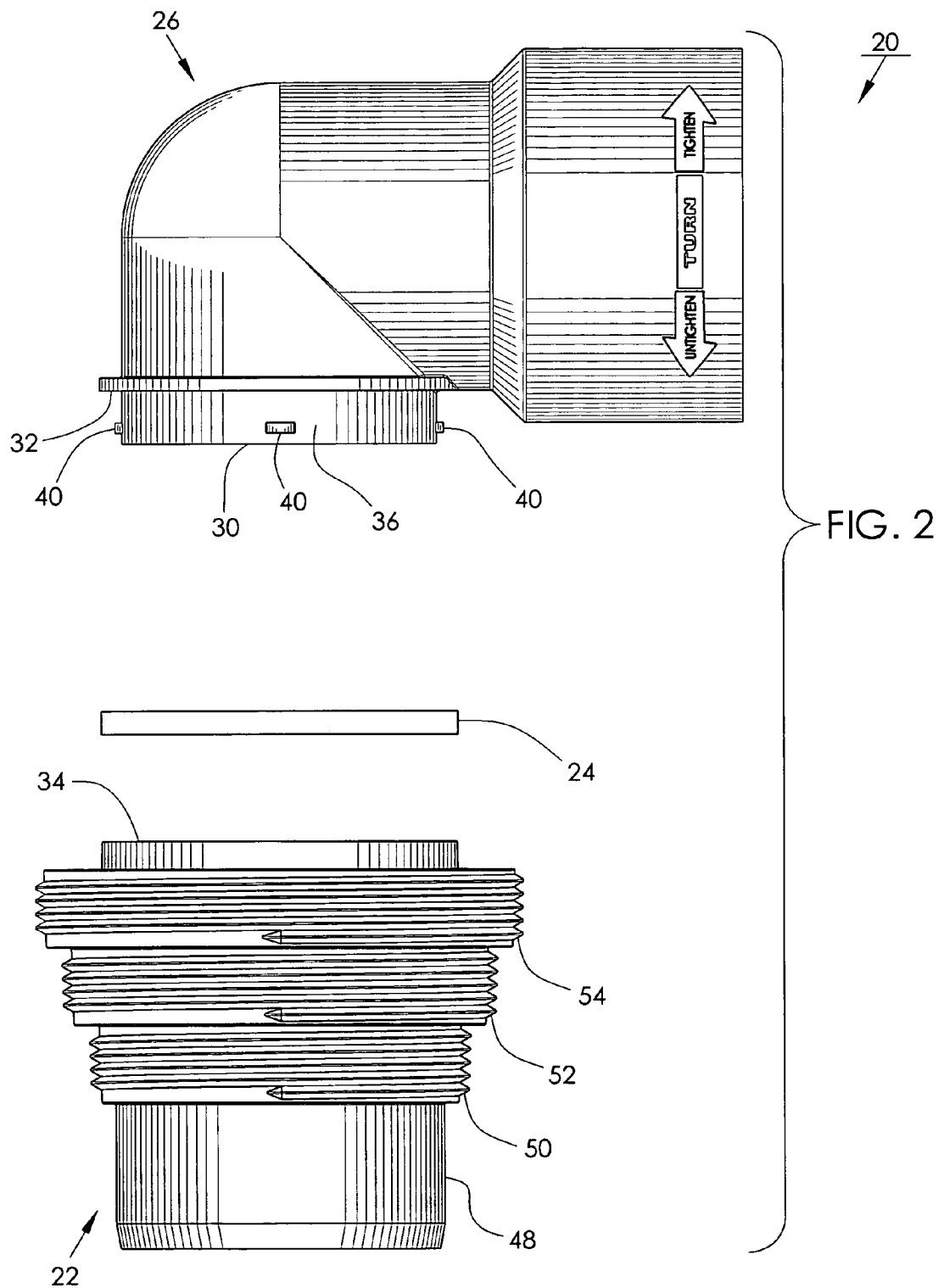
FIG. 2 is an exploded front elevational view of the same invention of FIG. 1.

Referring now to the drawings and more specifically to FIG. 1 and FIG. 2.

Adapter assembly 20 includes tubular member 26, adapter member 22, and flexible seal 24 constructed in accordance with the present invention.

Tubular member 26 is generally L-Shaped having a hollow interior throughout its length, and which connects to a sewage drain pipe on one end with threads 11 for fluid communication therewith. The ends of tubular member 26 are aligned perpendicular to one another.

Adapter member 22 having one or more adaptive geometries on the discharge end is complimentary to a disposal site inlet member. The geometry shown includes four different adaptive geometries 48, 50, 52, and 54, to match multiple types of disposal inlets.

Tubular member 26 and adapter member 22 are constructed of a suitable thermoplastic while flexible seal 24 is constructed of a nitrile, silicone or similar flexible material meant for creating a fluid seal.

Tubular member discharge 30 is complimentary to adapter member inlet 28. The outside diameter of tubular member discharge OD surface 36 fitting inside the inside diameter of adapter member inlet ID surface 38 wherein flexible seal 24 fits on tubular member discharge OD surface 36 and is compressed axially between annular tubular member seal flange 32, and adapter member annular inlet face 34. Adapter member inlet 28 includes continuous outside diameter surface 39.

Figure 4:
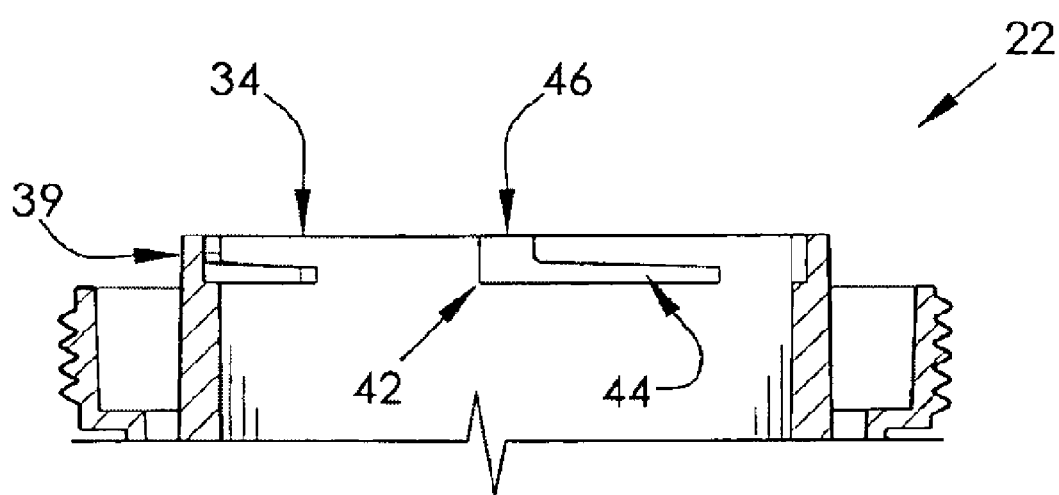
FIG. 4 is a cross-sectional elevational view of the adapter member of the invention as seen along lines 4-4 in FIG. 1.

Rectangularly shaped lugs 40 on tubular member 26 provide a means for coupling and fit into a complimentary means for coupling on adapter member 22 namely, helixed receiving slots or lug channels 42. Lugs 40 are initially engaged axially into relatively wide channel opening portions 46 and then rotationally engaged into narrow channel rotary portions 44 to accommodate rectangular lugs 40. FIG. 4 shows a cross sectional view of adapter member 22 showing one of wide channel opening portions 46 having receiving slot 42 and channel rotary portion 44. Rotary portions 44 have a slight helix away from adapter member annular inlet face 34 so that the rotational portion of the engagement provide axial compression on flexible seal 24 to ensure a consistent dependable fluid seal. Helixed lug channel 42 additionally make assembly and disassembly very easy while ensuring the sections can not be accidentally disengaged. Additionally, the slight helix allows for continued effective sealed engagement discounting wear due to the pressure of engaging plastic surfaces over time and multiple uses. The number of lugs 40 and lug channels 42 and the shape thereof are not set and are interchangeable between members, the only requirement is that they are complimentary such that tubular member 26 and adapter member 22 will engage axially and then rotationally for a positive mechanical lock.

Figure 3:
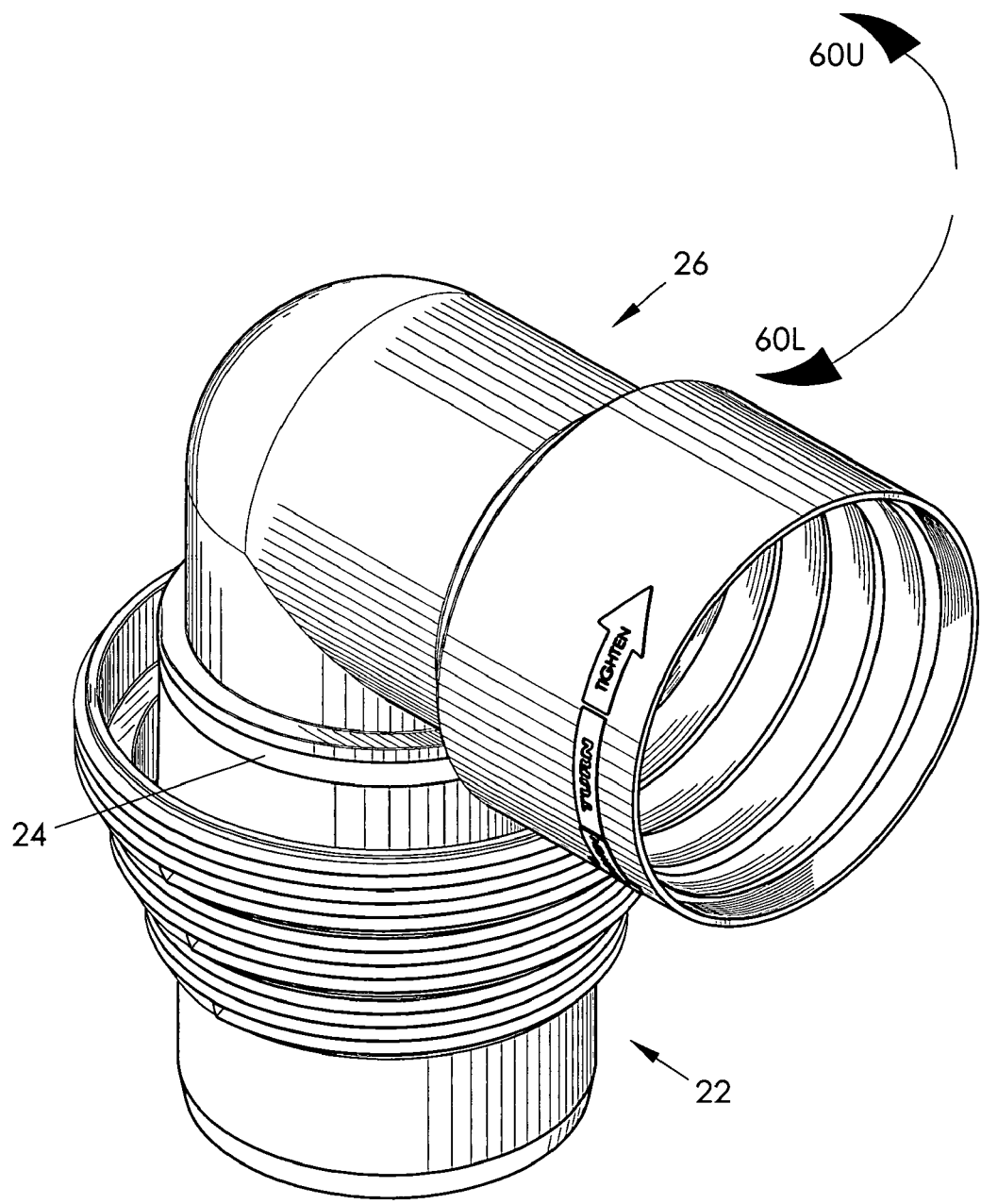
FIG. 3 is a front, top right perspective assembled view of the same invention of FIG. 1.

FIG. 3 shows the rotational motion between tubular member 26 and adapter member 22. Clockwise directional arrow 60L indicates locking rotational engagement between tubular member 26 and adapter member 22 and counterclockwise directional arrow 60U indicates unlocking rotational engagement between tubular member 26 and adapter member 22.

What is claimed is:

1. An adapter assembly for coupling a sewage drain pipe to a sewage disposal site inlet for fluid communication therewith, comprising:
    a) a hollow L-shaped tubular member, said tubular member capable of connecting to an end of a corrugated sewage drain pipe, a lug member, said lug member positioned on said tubular member; and
    b) a hollow adapter member, said adapter member for connection to a sewage disposal site inlet, said adapter member comprising an inlet, said adapter inlet defining an inside diameter surface and an outside diameter surface, said adapter inlet defining an adapter member annular inlet face, said adapter member annular inlet face defining a slot opening, said slot opening having a rectangular shape and extending axially along said inside diameter surface of said adapter inlet, said outside diameter surface of said adapter inlet being continuous, said adapter inlet defining a lug channel along said inside diameter surface, said slot opening in communication with said lug channel, said lug channel comprising a rotary portion, said slot opening for receiving said lug member for rotation in said rotary portion to provide a secure connection for fluid communication between said tubular member and said adapter member.

2. The adapter assembly as recited in claim 1, wherein:
    said tubular member comprises a discharge, a plurality of lug members, said discharge defining an outside diameter surface, said plurality of lug members mounted on said discharge outside diameter surface; and
    said adapter member comprises an inlet, said adapter inlet defining an inside diameter surface, said inlet inside diameter surface defining a plurality of lug channels.

3. The adapter assembly as recited in claim 2 further comprising a flange, said flange positioned on said discharge proximate said lug member, an annular flexible seal, said annular flexible seal disposed on said discharge in contact with said flange.

4. The adapter assembly as recited in claim 3 wherein said flexible seal is continuous and is compressed between said tubular member and said adapter member during coupling.

5. The adapter assembly as recited in claim 1, wherein the ends of said tubular member are perpendicular to one another.

6. The adapter assembly as recited in claim 1, wherein said tubular member defines a helix shaped thread, said thread for engaging a corrugated sewage drain pipe.

7. The adapter assembly as recited in claim 1, wherein said lug channel is tapered.

8. The adapter assembly as recited in claim 7 wherein said rectangular slot opening has a depth greater than the short dimension of said lug member and will accommodate the long dimension of said lug member and said rotary portion is sized to accommodate the short dimension of said lug member during coupling and said tapered lug channel will functionally engage said lug member during coupling.

9. The adapter assembly as recited in claim 1, wherein said lug channel is helix-shaped.

10. The adapter assembly as recited in claim 1 wherein said lug member is rectangularly shaped.

* * * * *